(12) United States Patent
Faust et al.

(10) Patent No.: US 10,539,082 B2
(45) Date of Patent: Jan. 21, 2020

(54) METHOD AND DEVICE FOR OPERATING A MULTI-CYLINDER INTERNAL COMBUSTION ENGINE

(71) Applicant: Schaeffler Technologies AG & Co. KG, Herzogenaurach (DE)

(72) Inventors: Hartmut Faust, Buehl (DE); Thomas Winkler, Offenburg (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 15/527,528

(22) PCT Filed: Oct. 29, 2015

(86) PCT No.: PCT/DE2015/200486
§ 371 (c)(1),
(2) Date: May 17, 2017

(87) PCT Pub. No.: WO2016/078653
PCT Pub. Date: May 26, 2016

(65) Prior Publication Data
US 2017/0350334 A1    Dec. 7, 2017

(30) Foreign Application Priority Data

Nov. 19, 2014   (DE) .................. 10 2014 223 577
Dec. 23, 2014   (DE) .................. 10 2014 226 915

(51) Int. Cl.
*F02D 41/00*  (2006.01)
*F02B 75/18*  (2006.01)
(Continued)

(52) U.S. Cl.
CPC .......... *F02D 41/0087* (2013.01); *F02B 75/18* (2013.01); *F02D 13/06* (2013.01);
(Continued)

(58) Field of Classification Search
CPC .... F02D 41/0087; F02D 13/06; F02D 17/023; F02B 75/18; F02B 2075/1824; F16F 15/145; F01L 2013/001
(Continued)

(56) References Cited

U.S. PATENT DOCUMENTS 5,490,486 A    2/1996   Diggs et al.
7,028,660 B2   4/2006   Rutten
(Continued)

FOREIGN PATENT DOCUMENTS

DE        10233284 A1      2/2004
DE     102012205792 A1     12/2012
DE       102012221544      6/2013

OTHER PUBLICATIONS

International Search Report of PCT/DE2015/200486, 2 pages, dated Apr. 3, 2016.

*Primary Examiner* — Syed O Hasan
(74) *Attorney, Agent, or Firm* — Davidson, Davidson & Kappel, LLC

(57) ABSTRACT

A method for operating a multi-cylinder internal combustion engine in which every active cylinder operates in a four-stroke mode and every deactivated cylinder filled with an approximately completed gas filling is compressed and expanded during the four-stroke operation of the activated cylinder. In a method in which excitations of a crankshaft speed are minimized, a limited number of even-numbered cylinders of a multi-cylinder internal combustion engine (2) having a maximum even number of cylinders (20, 21, 22, 23, 24, 25) are deactivated sequentially, the limited even number of cylinders being smaller than the maximum even number of cylinders (20, 21, 22, 23, 24, 25) of the multi-cylinder internal combustion engine (2).

17 Claims, 5 Drawing Sheets

(51) Int. Cl.
*F02D 13/06* (2006.01)
*F16F 15/14* (2006.01)
*F02D 17/02* (2006.01)
*F01L 13/00* (2006.01)

(52) U.S. Cl.
CPC .......... *F02D 17/023* (2013.01); *F16F 15/145* (2013.01); *F01L 2013/001* (2013.01); *F02B 2075/1824* (2013.01); *Y02T 10/18* (2013.01)

(58) Field of Classification Search
USPC ....................................................... 123/311
See application file for complete search history.

(56) References Cited

U.S. PATENT DOCUMENTS

| | | | |
|---|---|---|---|
| 2003/0221653 A1* | 12/2003 | Brevick | F02B 75/22 123/192.2 |
| 2007/0142152 A1* | 6/2007 | Holmes | B60K 6/445 475/2 |
| 2009/0248278 A1* | 10/2009 | Nakasaka | F02D 13/0238 701/103 |
| 2014/0053802 A1* | 2/2014 | Rayl | F02D 41/0087 123/350 |
| 2014/0102398 A1 | 4/2014 | Orlamuender et al. | |
| 2014/0261315 A1* | 9/2014 | Willard | F02D 17/02 123/349 |
| 2014/0298952 A1 | 10/2014 | Mende et al. | |

\* cited by examiner

METHOD AND DEVICE FOR OPERATING A MULTI-CYLINDER INTERNAL COMBUSTION ENGINE

The invention relates to a method for operating a multi-cylinder internal combustion engine in which every active cylinder operates in a four-stroke mode and every deactivated cylinder filled with an approximately completed gas filling is compressed and expanded during the four-stroke operation of the activated cylinder, and a device for carrying out the method.

BACKGROUND

Multi-cylinder internal combustion engines are known in which cylinder deactivations occur when operating under partial load. In 6-cylinder internal combustion engines, three of six cylinders are shut down. These deactivated cylinders are filled with fresh air, this gas filling being approximately completed, and during a four-stroke cycle of an active cylinder a deactivated cylinder is compressed and expanded twice in "dummy mode." The second dummy expansion, offset by 360° from the first dummy expansion, takes place at an angle of rotation of the crankshaft of the drivetrain of the internal combustion engine at which an active cylinder is also in the power stroke. Because of this operation, not only is the power stroke of a deactivated cylinder lacking in comparison to an actively working cylinder, but in addition an excitation of a still active cylinder is amplified by the second dummy expansion of the deactivated cylinder, since these actions occur simultaneously (FIG. 5). This results in amplified excitation amplitudes of the $1.5^{th}$ order of a crankshaft rotation speed, which cannot be absorbed without a cost.

SUMMARY OF THE INVENTION

It is an object of the present invention to provide a method for actuating a multi-cylinder internal combustion engine, in which the excitation amplitudes of an active cylinder are reduced by a deactivated cylinder.

According to the invention, the object is fulfilled by sequentially deactivating a limited number of even-numbered cylinders of a multi-cylinder internal combustion engine having a maximum even number of cylinders, where the limited even number of cylinders is smaller than the maximum even number of cylinders of the multi-cylinder internal combustion engine. The advantage of this is that the second dummy expansion of a deactivated cylinder takes place at a point in time in which a power stroke of an active cylinder would occur if the internal combustion engine were operating under full load. An additive overlay of this sort makes the excitation of fluctuations in the torque and speed of the internal combustion engine more harmonious and uniform overall. Since the excitation amplitudes tend to behave similarly to those of a fully-firing internal combustion engine, with cylinder deactivation of this sort a smaller excitation amplitude of the cylinders is produced.

Advantageously, the sequential deactivation of the limited even number of cylinders occurs depending on a demand on the internal combustion engine for power and/or speed. This sequential multi-stage character of the deactivation enables partial load modes of the internal combustion engine to be set with greater variability, which results in a reduction in fuel consumption.

There may be provision to operate the engine initially in a first partial-load mode, depending on a power demand or a speed demand, and in a second partial-load mode when the power demand or speed demand changes. The two partial-load modes, or partial-load operating states, then differ in the number of deactivated cylinders. If less power is needed in the second operating state, then there is provision for a second partial-load mode to be used in this second operating state, in which more cylinders are deactivated than in the first partial-load mode.

In one design, the duration of one period of the sequence of active and deactivated cylinders corresponds to one revolution of the crankshaft. The result of this is that the excitation of the amplitudes of the crankshaft speed takes place in a harmonic of the $1^{st}$ order, which is easily absorbed.

In one variant, in a 6-cylinder internal combustion engine two cylinders are deactivated to set a first partial-load mode. The two deactivated cylinders tend to imitate more or less the behavior of an originally fired cylinder, so that excitations of the crankshaft rotation speed occur more harmoniously and uniformly overall.

In an alternative, in a 6-cylinder internal combustion engine four cylinders are deactivated to set a second partial-load mode; in this case, the second partial-load operation of the internal combustion engine is less powerful than the first partial-load mode of the internal combustion engine. The internal combustion engine can be operated even in such a reduced partial-load mode through a more frequent shut-down mode, while fuel consumption is improved.

The method can therefore provide that for the same 6-cylinder engine a first partial-load mode with two deactivated cylinders is provided, and a second partial-load mode with four deactivated cylinders. In particular, it is possible by means of an actuation system to provide that the appropriate partial-load mode is chosen depending on the required power or the required engine speed.

In one variant, to absorb an excitation of a crankshaft speed which arises due to the cylinder pressures or piston motion, a centrifugal pendulum is used which has an oscillation frequency or order which is matched to the excitation of the crankshaft speed. Such a centrifugal pendulum constitutes a simple design measure, which is placed in the drivetrain of the internal combustion engine in order to absorb the excitations of the crankshaft speed which occur.

Another embodiment includes the provision that in an engine having two partial-load modes described above, with different numbers of deactivated cylinders, exactly one centrifugal pendulum is provided, which is designed for the speed of the crankshaft in only one of the load modes, i.e., full load or first or second partial-load mode.

When operating a 6-cylinder internal combustion engine, it has been found that a single centrifugal pendulum which is designed for one operating mode is sufficiently effective in the other operating modes also. More complex designs or the provision of additional centrifugal pendulums can therefore be dispensed with.

A refinement of the invention relates to a device for operating a multi-cylinder internal combustion engine, which activates or deactivates cylinders of the multi-cylinder internal combustion engine. In a device in which excitations of a crankshaft speed are reduced, means are present which sequentially deactivate a limited even number of cylinders of the maximum even number of cylinders of the multi-cylinder internal combustion engine, the limited even number of cylinders being smaller than the maximum even number of cylinders of the multi-cylinder internal combustion engine. The advantage of this is that dummy expansions of the deactivated cylinder take place at a crankshaft position in which a power stroke of an active cylinder occurs when the internal combustion engine is operating under full load. That reduces the excitation of the crankshaft speed.

In one variant, in a 6-cylinder internal combustion engine the means deactivate two cylinders to set a first partial-load mode. The two deactivated cylinders here tend to imitate the behavior of an originally active cylinder, so that the excitation behaves similarly to that of a fully-firing internal combustion engine.

Alternatively, in a 6-cylinder internal combustion engine, the means deactivate four cylinders to set a second partial-load mode; in this case, the second partial-load mode of the internal combustion engine is less powerful than the first partial-load mode of the internal combustion engine. This enables driving with fuel savings with a multi-cylinder internal combustion engine, even with very small partial loads.

Another refinement of the invention relates to a drivetrain of a motor vehicle, including a multi-cylinder internal combustion engine which is connected to a control device that operates the internal combustion engine in a full mode with all cylinders or in a cylinder deactivation mode with only a specified number of cylinders, the cylinders being connected to a crankshaft. In such a drivetrain, a centrifugal pendulum is positioned on the crankshaft to absorb an occurring excitation of a crankshaft rotation speed; the centrifugal pendulum has an oscillation frequency or order which is matched to the $1^{st}$ order excitation of the crankshaft rotation speed by the cylinders. Such a centrifugal pendulum here constitutes a simple constructive means by means of which $1^{st}$ order excitations of the crankshaft rotation speed can be absorbed.

BRIEF DESCRIPTION OF THE DRAWINGS

The invention allows numerous embodiments. Two of these are to be explained in greater detail on the basis of the figures depicted in the drawing.

The figures show the following.

DETAILED DESCRIPTION

Like features are identified by the same reference labels.

Figure 1:
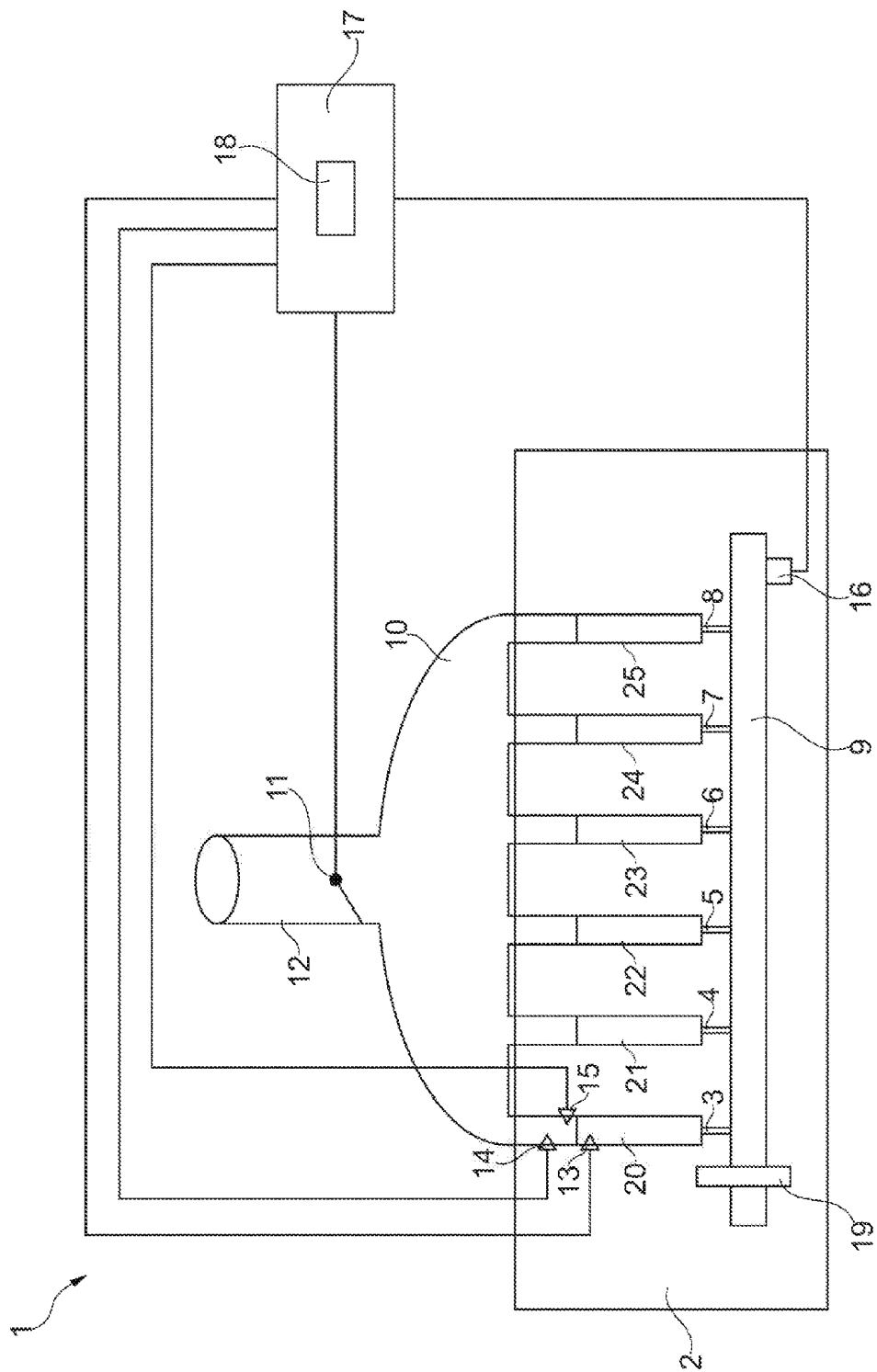
FIG. 1 a schematic diagram of a drivetrain according to the invention

FIG. 1 shows a schematic diagram of a drivetrain 1 of a motor vehicle in which an internal combustion engine 2 has six cylinders, wherein each cylinder 20, 21, 22, 23, 24, 25 is connected by a connecting rod 3, 4, 5, 6, 7, 8 to a crankshaft 9 and drives the latter on the basis of the pressure changes caused by the combustions occurring in the cylinders 20, 21, 22, 23, 24, 25. The cylinders 20, 21, 22, 23, 24, 25 are connected to a suction pipe 10, which is closed in relation to an air intake pipe 12 by a throttle valve 11. Into each cylinder 20, 21, 22, 23, 24, 25 projects a jet 13 for injecting fuel and an inlet valve 14 for fresh air, causing a mixture of fuel and air to form in each active cylinder 20, 21, 22, 23, 24, 25. Furthermore, each cylinder 20, 21, 22, 23, 24, 25 has an outlet valve 15 for exhaust gases that develop during the combustion process. In the interest of clarity, the jet 13 for fuel injection, the inlet valve 14 and the outlet valve 15 are depicted on only one cylinder.

The crankshaft 9 carries a centrifugal pendulum 19 which operates as a vibration absorber. Positioned opposite the crankshaft 9 is a rotation speed sensor 16, which is connected to a control device 17 that assigns the combustions of the individual cylinders 20, 21, 22, 23, 24, 25 to the signal of the crankshaft sensor 16, which presents a crankshaft angle. The control device 17 includes a microprocessor 18. Depending on the operating mode in which the internal combustion engine 2 is to be operated, the control device 17 actuates the jet 13 to inject fuel and/or the inlet valve 14 for fresh air and/or the outlet valve 15 for exhaust gas. In full-load mode, all six cylinders 20, 21, 22, 23, 24, 25 are operated in a four-stroke operating mode (intake, compression, work, exhaust). In a partial-load mode, a sequential cylinder deactivation is carried out.

Figure 2:
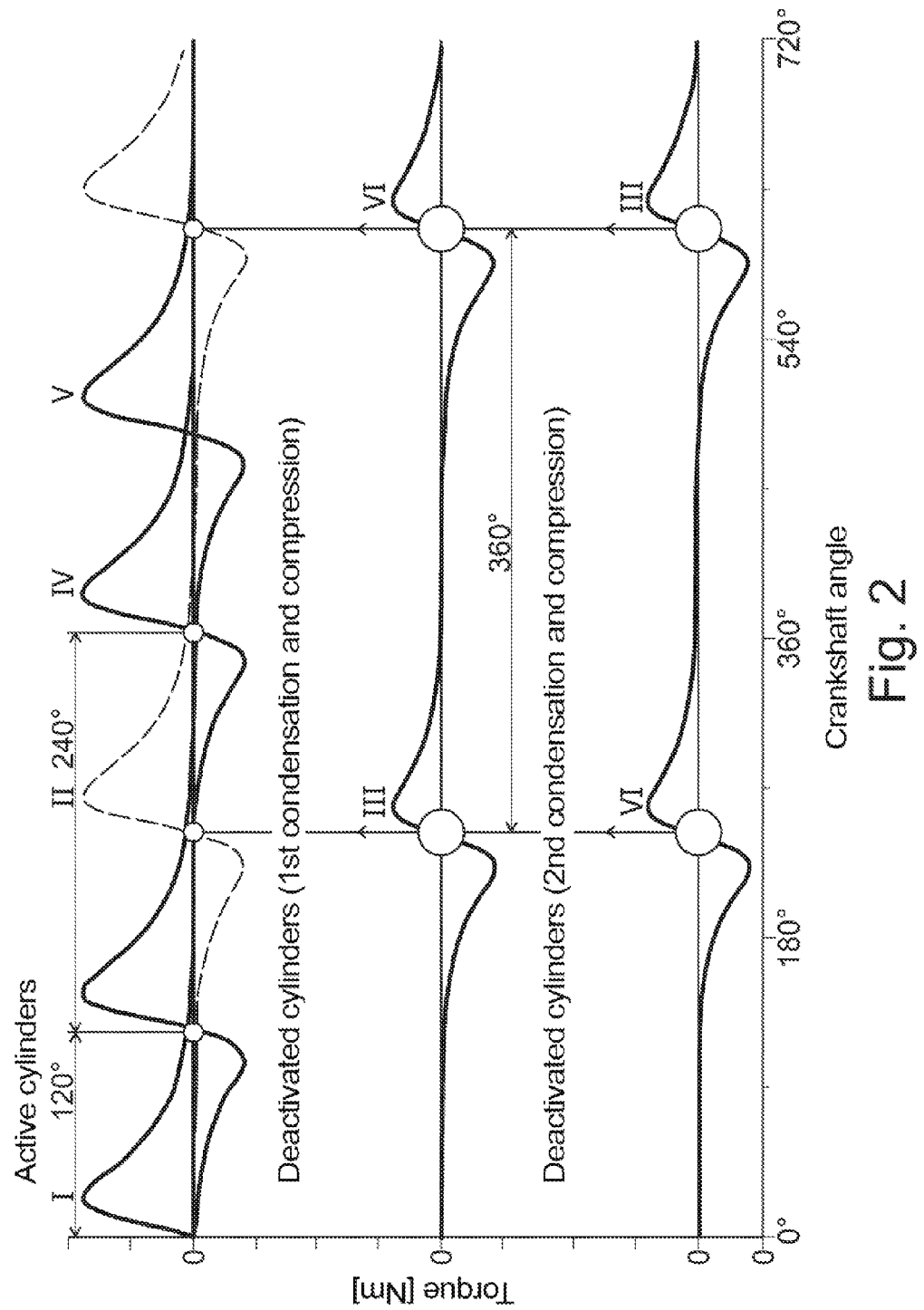
FIG. 2 a first exemplary embodiment of the method according to the invention, FIG. 3 a second exemplary embodiment of the method according to the invention, FIG. 4 an exemplary embodiment of an excitation amplitude of an active cylinder in comparison to the prior art, using the method according to the invention, FIG. 5 an exemplary embodiment for deactivating cylinders of a 6-cylinder internal combustion engine according to the prior art.

According to FIG. 2, in a first deactivation mode the four cylinders are active. The designations I, II, III, IV, V, VI clarify the order of the ignition sequences, which is not identical to the cylinder order on the crankshaft 9. The deactivated cylinders are filled with fresh air in this case. The inlet valve 13 for fresh air, as well as the outlet valve 15, are closed after the filling with fresh air, so that a sealed gas volume is formed in these deactivated cylinders. During a four-stroke working mode of the active cylinders (FIG. 2*a*), this sealed gas volume is compressed and expanded twice (FIGS. 2*b* and 2*c*). With ignition sequence III as well as with ignition sequence VI, these dummy expansions occur at a time when an active cylinder has its power stroke in full-load mode. The dummy expansions which occur during such a cycle are offset by a crankshaft angle of 360°. That tends to result in a uniform excitation of torque and rotational speed fluctuations in the crankshaft speed. The occurring excitation of the crankshaft speed is an excitation of the $1^{st}$ order, which is absorbed by the centrifugal pendulum 19, since the frequency of the centrifugal pendulum 19 is tuned to the $1^{st}$ order excitation of the crankshaft speed.

Figure 3:
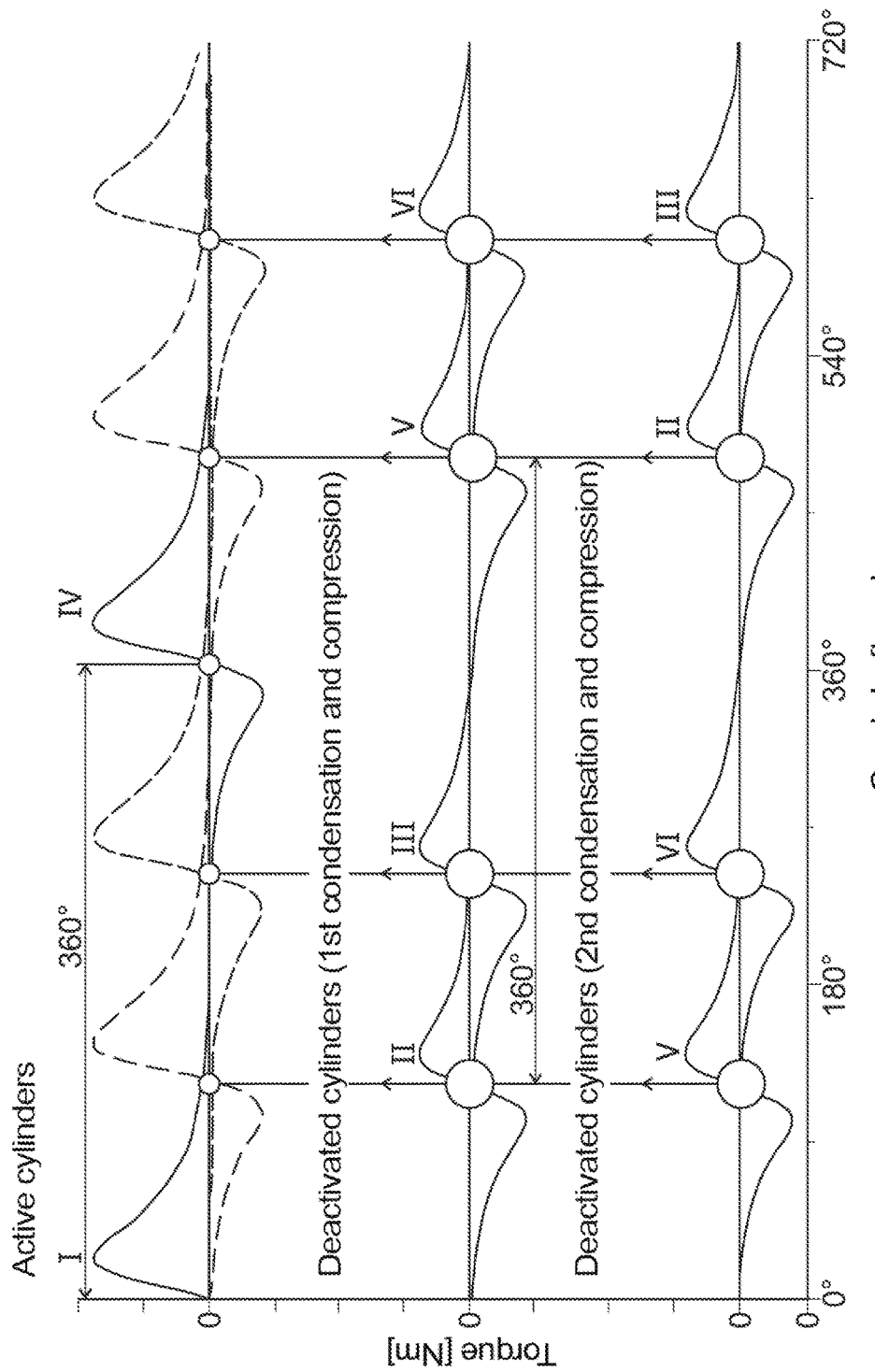

To further reduce fuel consumption when the demand for torque is further reduced, a second deactivation mode is provided, which is illustrated in FIG. 3. In this deactivation mode, only two cylinders are active, and two ignition sequences occur, I and IV (FIG. 3*a*). The other four cylinders are deactivated, and in the manner described comprise a gas volume, which is subjected to a dummy expansion for each deactivated cylinder at a crankshaft angle interval of 360°, with ignition sequences II, III, V, VI (FIGS. 3*b* and 3*c*). Here too, the dummy expansions occur at crankshaft angles at which a working stroke of an active cylinder would have occurred in full-load mode. In this mode as well, in each case two dummy expansions (ignition sequence II, V; III, VI; V, II; VI, III) are advantageously superimposed at the positions where there is initially an active cylinder in its power stroke in full-load mode. This makes the excitation amplitude smaller than in the prior art in this second mode too.

Since the cycle duration of the sequence of active and deactivated cylinders is also exactly one revolution of the crankshaft, this second partial-load mode also involves an excitation of a $1^{st}$ order harmonic. This $1^{st}$ order excitation is likewise absorbed by the centrifugal pendulum 19, since the centrifugal pendulum 19 has an oscillation frequency which corresponds to the $1^{st}$ order excitation.

Figure 4:
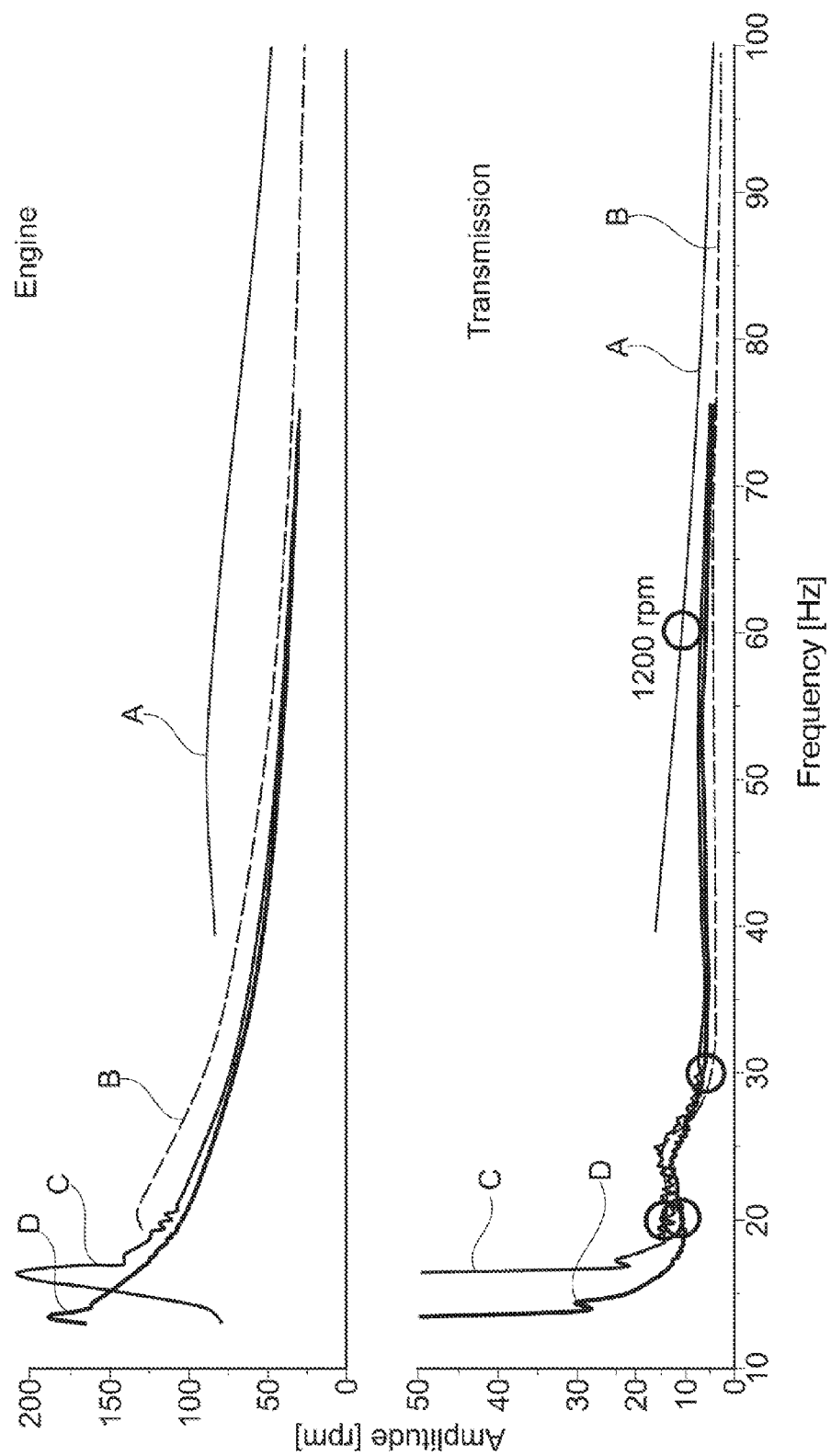
Figure 5:
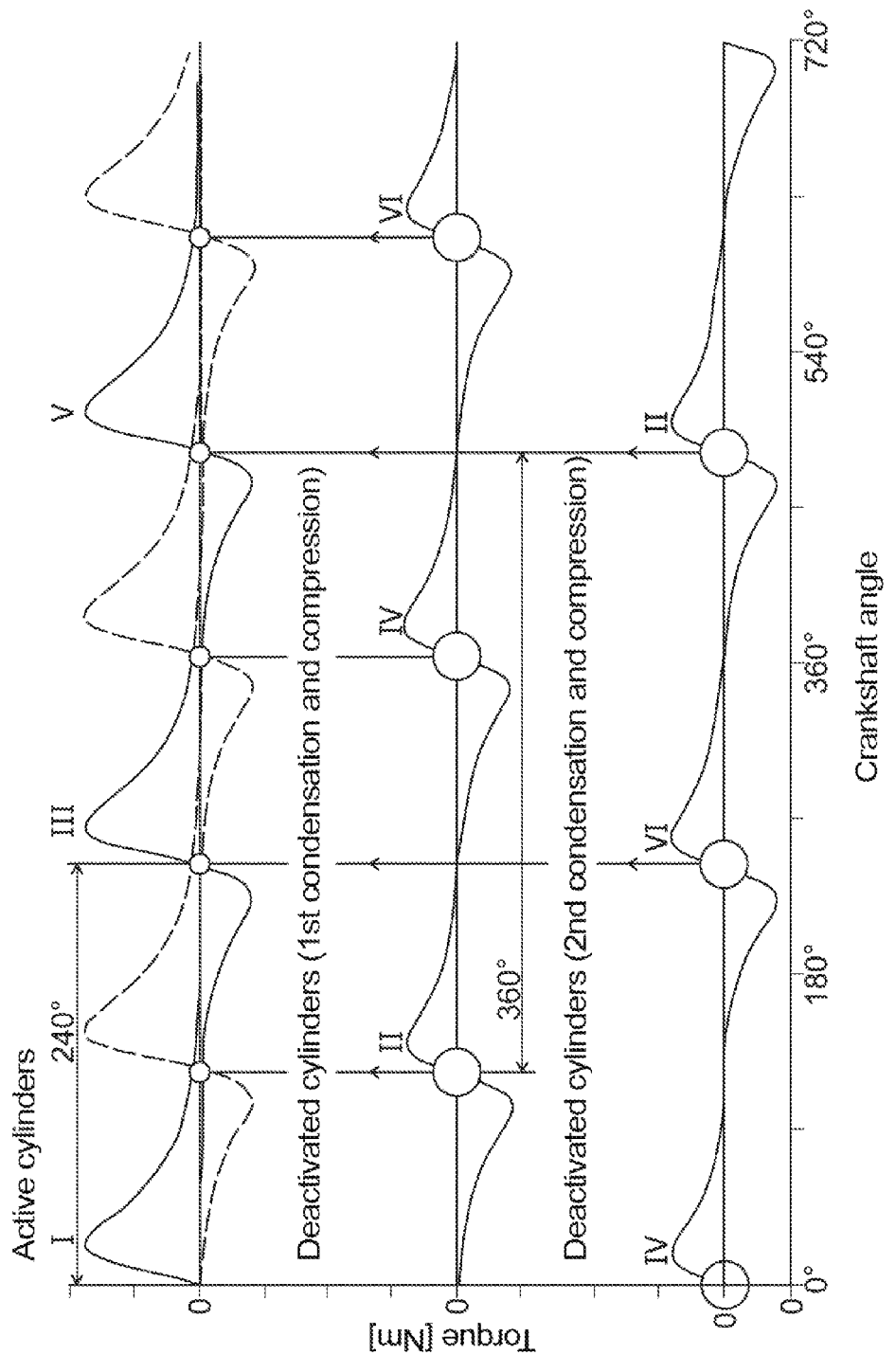

FIG. 4 shows a comparison of the excitation amplitude of the crankshaft speed over a frequency at the internal combustion engine 2 (FIG. 4*a*) and at the transmission input (FIG. 4*b*). Plot A shows the 6-cylinder internal combustion engine in full-load mode, while plot B depicts the deactivation of three of the total of six cylinders of the internal combustion engine 2 known from the prior art. Plot C illustrates the deactivation of two cylinders, while plot D depicts the deactivation of four cylinders. The torque of the internal combustion engine 2 here is 450 Nm in full-load mode, while with three cylinders deactivated according to the prior art the torque is only 150 Nm and the amplitude of the crankshaft speed includes excitations of the $1.5^{th}$ order. With the proposed solution, with two cylinders deactivated, the internal combustion engine 2 delivers a torque of 200 Nm, with $1^{st}$ order excitations of the crankshaft speed absorbed by the centrifugal pendulum 19. With four cylinders of the 6-cylinder internal combustion engine 2 deactivated, a torque of 100 Nm is set, which likewise becomes possible with absorption of the $1^{st}$ order excitations by the centrifugal pendulum 19.

The solution presented according to the invention permits operation of the internal combustion engine 2 in three operating modes, depending on the power or torque demands: the 6-cylinder full mode, and the sequential cylinder deactivations of four or two cylinders, where the excitations that arise when the cylinders are deactivated in the partial-load modes are absorbed by a centrifugal pendulum of the $1^{st}$ order, which reduces unwanted noises in the motor vehicle.

REFERENCE LABELS

1 drivetrain
2 internal combustion engine
3 connecting rod
4 connecting rod
5 connecting rod
6 connecting rod
7 connecting rod
8 connecting rod
9 crankshaft
10 suction tube
11 throttle valve
12 air intake pipe
13 fuel injection jet
14 inlet valve for fresh air
15 outlet valve for exhaust gas
16 crankshaft sensor
17 control device
18 microprocessor
19 centrifugal pendulum
20 cylinder
21 cylinder
22 cylinder
23 cylinder
24 cylinder
25 cylinder
I ignition sequence
II ignition sequence
III ignition sequence
IV ignition sequence
V ignition sequence
VI ignition sequence

What is claimed is:

1. A method for operating a multi-cylinder internal combustion engine in which every active cylinder operates in a four-stroke mode and every deactivated cylinder filled with an approximately completed gas filling is compressed and expanded during the four-stroke mode of the activated cylinder, the method comprising, of the multi-cylinder internal combustion engine having a maximum even number of cylinders, operating the multi-cylinder internal combustion engine in a full-load mode with all of the cylinders activated, each of the cylinders having a respective power stroke timing during the full-load mode;

deactivating sequentially a limited even number of cylinders, the limited even number of cylinders being smaller than the maximum even number of cylinders of the multi-cylinder internal combustion engine, each of the deactivated cylinders being operated to have dummy expansions that correspond to respective power stroke timing during the full-load mode, wherein the dummy expansions are performed when none of the activated cylinders is performing a power stroke.

2. The method as recited in claim 1 wherein the sequential deactivation of the limited even number of cylinders occurs depending on a demand on the internal combustion engine for power or speed.

3. The method as recited in claim 1 wherein a cycle duration of the sequence of active and deactivated cylinders corresponds to one revolution of the crankshaft.

4. The method as recited in claim 1 wherein the engine is a 6-cylinder internal combustion engine, and to set a first partial-load mode two cylinders are deactivated, and to set a second partial-load mode four cylinders are deactivated, the second partial-load mode of the internal combustion engine being less powerful than the first partial-load mode of the internal combustion engine.

5. The method as recited in claim 1 wherein, to absorb an excitation of a crankshaft speed occurring due to cylinder pressures or piston motion, exactly one centrifugal pendulum is used, the centrifugal pendulum having an oscillation frequency or order matched to the excitation of the crankshaft speed, and effective in both a first and a second partial-load modes.

6. A device for operating a multi-cylinder internal combustion engine which activates or deactivates cylinders of the multi-cylinder internal combustion engine, the multi-cylinder internal combustion engine being operable in a full-load mode with all of the cylinders activated, each of the cylinders having a respective power stroke timing during the full-load mode, the device comprising:

a deactivator to sequentially deactivate a limited even number of cylinders of a maximum even number of cylinders of the multi-cylinder internal combustion engine, the limited even number of cylinders being smaller than the maximum even number of cylinders of the multi-cylinder internal combustion engine, the deactivator configured to operate the deactivated cylinders to have dummy expansions that correspond to a respective power stroke timing during the full-load mode, wherein the deactivated cylinders include a first deactivated cylinder and a second deactivated cylinder, the deactivator being configured such that the sequential deactivation of the limited even number of cylinders by the deactivator includes the deactivator operating the first deactivated cylinder and the second deactivated cylinder to perform a dummy expansion simultaneously.

7. The device as recited in claim 6 wherein the internal combustion engine is a 6-cylinder internal combustion engine and in a first operating mode the deactivator deactivates two cylinders to set a first partial-load mode.

8. The device as recited in claim 6 wherein the internal combustion engine is a 6-cylinder internal combustion engine and in a second operating mode the deactivator deactivates four cylinders to set a second partial-load mode, the second partial-load mode of the internal combustion engine being less powerful than a first partial-load mode of the internal combustion engine.

9. A drivetrain of a motor vehicle, the drivetrain comprising:
  a multi-cylinder internal combustion engine connected to a control device operating the internal combustion engine in a full mode with all cylinders activated or in a cylinder deactivation mode with only a specified number of cylinders activated, each of the cylinders having a respective power stroke timing during the full mode, the cylinders being connected to a crankshaft, the control device configured to operate deactivated cylinders to have dummy expansions that correspond to a respective power stroke timing during the full-load mode; and
  a centrifugal pendulum positioned on the crankshaft to absorb an occurring excitation of a crankshaft rotation speed, the centrifugal pendulum having an oscillation frequency or order matched to the excitation of the crankshaft rotation speed by the cylinders,
  wherein the deactivated cylinders include a first deactivated cylinder, a second deactivated cylinder, a third deactivated cylinder and a fourth deactivated cylinder, the control device being configured such that a sequential deactivation of the limited even number of cylinders by a deactivator includes the deactivator operating the first deactivated cylinder and the third deactivated cylinder to perform a dummy expansion simultaneously and the deactivator operating the second deactivated cylinder and the fourth deactivated cylinder to perform a dummy expansion simultaneously.

10. The method as recited in claim 1 wherein the deactivated cylinders each have two dummy expansions during a four-stroke working mode of the active cylinders.

11. The method as recited in claim 1 wherein the deactivating sequentially of the limited even number of cylinders includes filling the deactivated cylinders with fresh air and then closing a respective inlet valve and outlet valve of each deactivated cylinder to form a sealed gas volume in each deactivated cylinder, each of the sealed gas volumes being compressed and expanded twice during a four-stroke working mode of active cylinders.

12. The method as recited in claim 1 wherein the deactivated cylinders include a first deactivated cylinder and a second deactivated cylinder, the deactivating sequentially of the limited even number of cylinders includes performing a dummy expansion of the first deactivated cylinder and the second deactivated cylinder simultaneously.

13. The method as recited in claim 12 wherein the first and second deactivated cylinders are operated to have dummy expansions that correspond to both the respective power stroke timing of the first deactivated cylinder during the full-load mode and the respective power stroke timing of the second deactivated cylinder during the full-load mode.

14. The method as recited in claim 1 wherein the deactivated cylinders include a first deactivated cylinder, a second deactivated cylinder, a third deactivated cylinder and a fourth deactivated cylinder, the deactivating sequentially of the limited even number of cylinders includes performing a dummy expansion of the first deactivated cylinder and the third deactivated cylinder simultaneously and performing a dummy expansion of the second deactivated cylinder and the fourth deactivated cylinder simultaneously.

15. The method as recited in claim 14 wherein the first and third deactivated cylinders are operated to have dummy expansions that correspond to both the respective power stroke timing of the first deactivated cylinder during the full-load mode and the respective power stroke timing of the third deactivated cylinder during the full-load mode, and the second and fourth deactivated cylinders are operated to have dummy expansions that correspond to both the respective power stroke timing of the second deactivated cylinder during the full-load mode and the respective power stroke timing of the fourth deactivated cylinder during the full-load mode.

16. The device as recited in claim 6 wherein the deactivator is configured operate the first and second deactivated cylinders to have dummy expansions that correspond to both the respective power stroke timing of the first deactivated cylinder during the full-load mode and the respective power stroke timing of the second deactivated cylinder during the full-load mode.

17. The drivetrain as recited in claim 9 wherein the control device is configured to operate the first and third deactivated cylinders to have dummy expansions that correspond to both the respective power stroke timing of the first deactivated cylinder during the full-load mode and the respective power stroke timing of the third deactivated cylinder during the full-load mode, and the control device is configured to operate the second and fourth deactivated cylinders to have dummy expansions that correspond to both the respective power stroke timing of the second deactivated cylinder during the full-load mode and the respective power stroke timing of the fourth deactivated cylinder during the full-load mode.

* * * * *